LASER PULSE COMMUNICATION SYSTEM

Filed April 16, 1963 2 Sheets-Sheet 1

Inventors:
Kiyo Tomiyasu,
James R. Whitten,
by Paul G. Frank
Their Attorney.

LASER PULSE COMMUNICATION SYSTEM
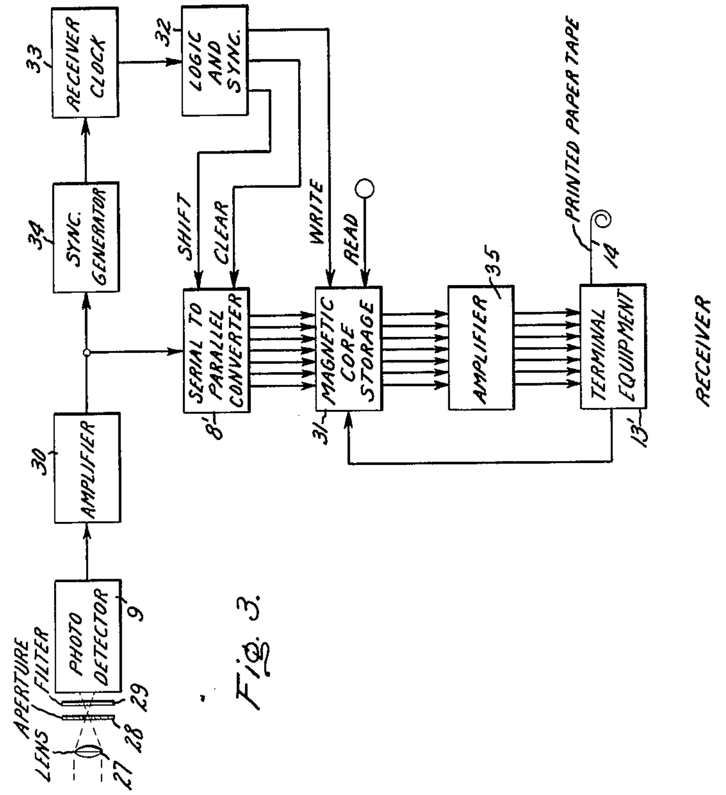
Fig. 3.
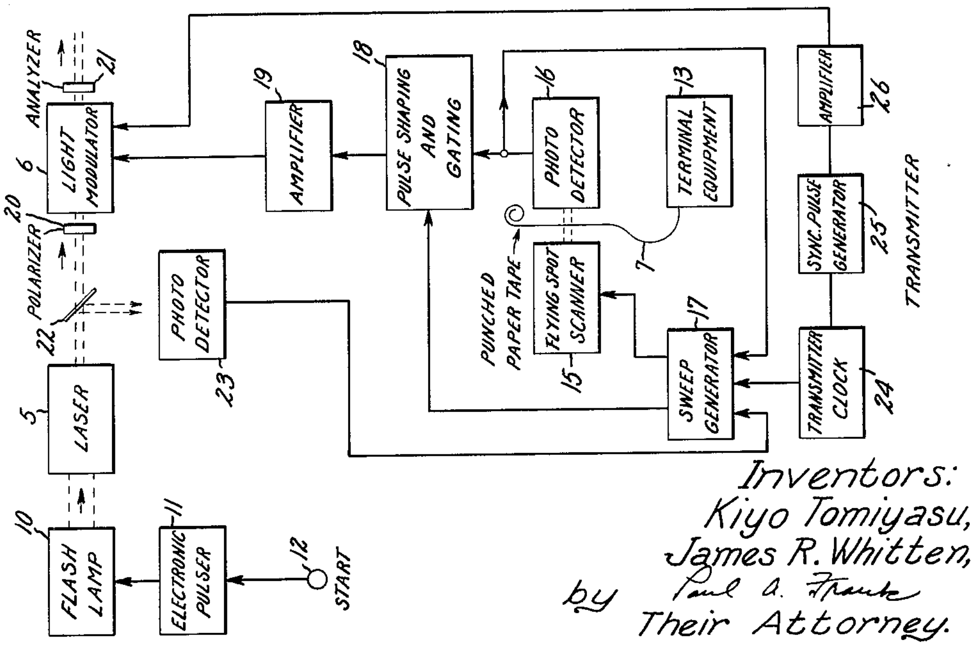
Inventors:
Kiyo Tomiyasu,
James R. Whitten,
by Paul A. Frank
Their Attorney.

United States Patent Office 3,243,592 Patented Mar. 29, 1966

3,243,592

LASER PULSE COMMUNICATION SYSTEM

Kiyo Tomiyasu, Scotia, and James R. Whitten, Ballston Lake, N.Y., assignors to General Electric Company, a corporation of New York Filed Apr. 16, 1963, Ser. No. 273,518
6 Claims. (Cl. 250—199)

Our invention relates to a communication system employing a pulsed laser device, and in particular, to a laser pulse communication system adapted to transmit and receive digital information at an extremely high rate of words per duration of laser pulse.

Communcation systems are conventionally defined by the frequency of electromagnetic energy or radiation upon which information is transmitted. This electromagnetic radiation is known as the carrier wave, and superimposed or modulated thereon is the information to be transmitted. The information modulation is generally described in absolute terms as an information bandwidth or modulation bandwith in units of frequency and as a percentage bandwidth or percentage modulation expressed as a percentage of the carrier frequency. The greater this information bandwidth or percentage bandwith, the greater the amount of information that is transmitted by the carrier wave. The percentage bandwith is generally limited to approximately 10 percent. As the carrier frequency is raised, a fixed percentage bandwidth becomes an increasingly larger information bandwidth which has the advantageous feature of increasing the available communication channels contained therein but also has the inherent disadvantage of occupying a greater portion of the spectrum of electromagnetic radiation. These two features are among the reasons why communication channels have been extended into the microwave spectrum of electromagnetic radiation. However, even this region of the spectrum is being rapidly occupied by the ever-increasing need for further communication channels. The need, therefore, exists to extend communication channels to an even higher frequency range in the spectrum of electromagnetic radiation and this next higher range includes the optical wavelengths.

One of the problems associated with optical communication systems is atmospheric scattering of visible light waves. A recently developed device, now conventionally described as a laser (light amplification by stimulated emission of radiation), offers a system capability which will not be as seriously degraded due to scattering as a system employing a more conventional light source. The output of a laser is a very narrow beam of light which is in the visible or near-visible frequency range of the electromagnetic energy spectrum. The energy within the light beam is exceptionally high since the light is concentrated within the narrow beam and also because the output of a laser may be a coherent light, that is, the particles of light emitted are in phase with each other. The high energy within the laser beam permits very long range communication, laser beams having been reflected from the surface of the moon, and the narrow beam feature renders the communication virtually free from detection and jamming.

Therefore, one of the principal objects of our invention is to develop a laser pulse communication system employing the pulsed output of a laser device to obtain a very narrow beam of pulses of light which may be adapted to carry a great amount of information.

Another important object of our invention is to develop a laser pulse communication system adapted to transmit and receive digital information at an extremely high rate of words per light pulse.

Briefly stated, and in accordance with our invention in meeting the objects enumerated above, we provide a laser device for generating a pulsed beam of light, the carrier wave, at the transmitter end of a communication system.

A data storage circuit is employed to store input information in digital form and to provide this information in serial form suitable for transmission purposes during the interval of generation of laser or light pulses. The input information in serial form actuates an optical or light modulator which superimposes the digital information on the pulsed light beam. Pulse code modulation is the preferred method of modulating the light pulses. Suitable synchronizing circuits are provided to synchronize the output of the data storage circuit with the light pulses emitting from the laser.

The receiver end of the communication system includes a suitable optical arrangement for collecting the light pulses, a demodulator to convert the light pulses to electrical signals, a data storage circuit, suitable synchronizing circuits, and a device for reading the output of the data storage.

The features of our invention which we desire to protect herein are pointed out with particularity in the appended claims. The invention itself, however, both to its organization and method of operation, together with further objects and advantages thereof, may best be understood by reference to the following description taken in connection with the accompanying drawings, wherein:

FIGURE 3 is a detailed block diagram indicating the various components of a laser pulse communication system in accordance with our invention.

Figure 1:
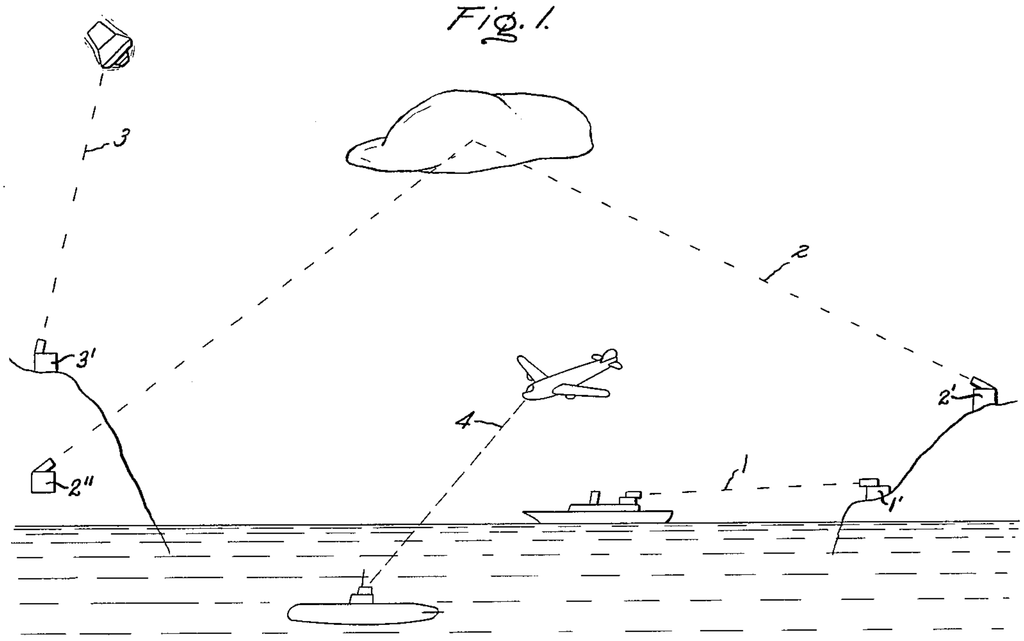
FIGURE 1 illustrates several communication paths for the pulsed laser beam which may be employed with our invention.

A laser pulse communication system may be described as a communication system having a transmitter end that emits energy in the visible and near visible wavelength spectrum of electromagnetic radiation and consists of discrete pulses of this energy. This spectrum includes the infrared, optical, and ultraviolet frequencies and is contained within a range of $10^7$ to $10^9$ megacycles per second. A given percentage of information bandwidth at such frequencies is a larger absolute bandwidth in cycles per second than occurs with the same percentage bandwidth at the lower radio and microwave frequencies and thereby provides a greater amount of available communication channels. For comparison, at microwave frequencies, the available information or modulation bandwidth is limited to a small percentage of the carrier frequency, usually about 10 percent, which thus provides a modulation bandwidth of about 1000 megacycles at X-band. At a laser output frequency of $3 \times 10^8$ megacycles per second, a very modest bandwith of about 1 percent represents a modulation bandwidth of 3,000,000 megacycles which is sufficient to transmit approximately one million television channels.

Laser pulse communication is effected by generating short duration pulses of high intensity and preferably coherent light at the transmitter end of the system. These pulses of light, which may conveniently be generated by a laser device, are modulated with the information desired to be transmitted. The laser light pulses are of short duration and merely by way of example may be in the order of 0.001 second duration. The modulation impressed on the laser pulses is preferably a pulse code modulation described in greater detail hereinafter.

A laser releases electromagnetic energy stored in discrete metastable states as a result of being excited by an electromagnetic signal of the correct frequency. Thus, a flash lamp may excite or optically pump the laser into a metastable higher energy state whereby a stimulated emission of monochromatic and directional (coherent) electromagnetic radiation is emitted from one end of the laser. This electromagnetic radiation or light is emitted in a plane wave having a very small divergence, in the order of 0.05 degree or less. This small divergence concentrates the energy of the laser into a beam of very intense light, thereby achieving a very high energy density and permitting long distance line-of-sight communication.

The laser pulse communication system of our invention is not limited to line-of-sight applications. Thus, the high energy concentration within the narrow light beam may be reflected from sharply defined clouds, buildings, and orbiting satellites for nonline-of-sight communication applications. Another distinct application of our pulse communication system is communicaton through a plasma of ionizable gas. Radio frequencies cannot propagte through a plasma formed about a space vehicle during the time the vehicle is re-entering the atmosphere since the radio frequency is too low compared to the plasma frequency and the radio signal is reflected thereby. The plasma frequency is $9000\sqrt{n}$ cycles per second, where $n$ is the number of electrons per cubic centimeter. During re-entry, $n$ may be typically $10^{16}$ and no higher than $10^{17}$. Thus to penetrate the plasma, the frequency of the signal must be higher than $3 \times 10^{12}$ cycles per second. A ruby laser frequency is $4.3 \times 10^{14}$ cycles per second and, hence, this laser beam readily passes through the densest re-entry plasma. A second requirement for laser communication through a plasma is that the spectral temperature of the laser output be appreciably higher than that of the plasma at the laser frequency. This requirement is necessary to attain a discernible signal-to-noise ratio. The spectral temperature of a pulsed ruby laser is in the order of $10^9$ to $10^{12}$° K. and the plasma temperature is about $10^4$° K. An optical filter at the receiver is preferably employed to perform an analogous function of the tuning circuit in a radio frequency receiver. If this optical filter cannot be made as narrow as the laser output bandwidth, there will be a degradation in the signal-to-noise ratio. This degradation will be in a range from $10^{-2}$ to $10^{3-}$. A discernible signal-to-noise ratio is produced even with this degradation.

A laser pulse or burst communication system may also be employed for transmission through an air-water interface. The state of the sea surface, that is, the change in the surface due to the moving position of the waves of water, has frequency components in the audio range and it is, therefore, difficult to transmit audio signals using an electromagnetic wave carrier since the sea state seriously degrades the signal-to-noise ratio. A burst communication system transmits rapidly, the bursts or pulses having a time interval of the range of one millisecond. The necessarily high modulation frequencies superimposed on this pulsed carrier insures transmission through the air-to-water interface before the sea state has changed significantly.

The several methods of laser pulse communication hereinabove described are pictorially represented in FIGURE 1 wherein line-of-sight communication is represented as a whole by numeral 1, nonline-of-sight or reflected communication by numeral 2, communication through a plasma 3, and communication through an air-to-water interface 4. Land-mounted transmitters and receivers constructed in accordance with our invention are designated as 1′, 2′, 2″ and 3′ corresponding to the line-of-sight communication 1, reflected communication 2, and communication through plasma 3.

Figure 2:
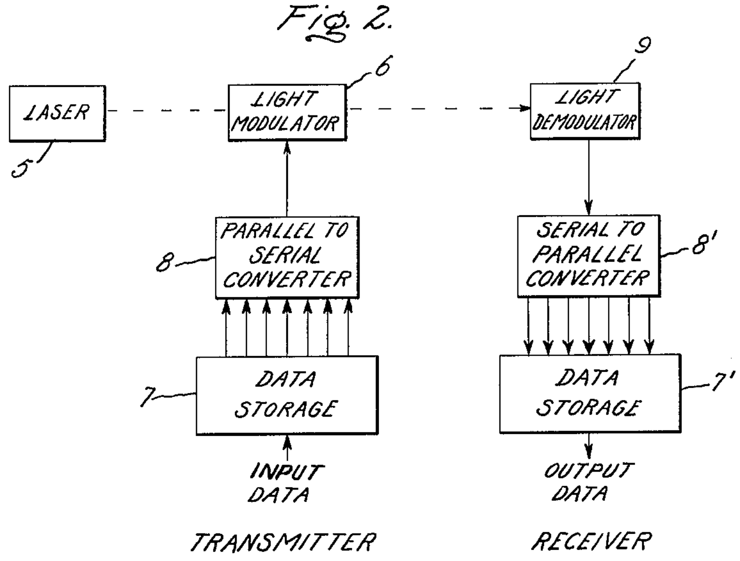
FIGURE 2 represents a basic block diagram of a laser pulse or burst communication system in accord with our invention.

A basic functional block diagram of a laser pulse communication system is illustrated in FIGURE 2. At the transmitter end of the system, input data, which comprises the information to be transmitted, is supplied from terminal equipment and converted from oral or recorded form to electrical quantities which are employed to modulate pulses of high intensity and preferably coherent light emitted by a pulsed laser device 5. A light modulator 6 may be of the transmission type wherein the modulation is impressed externally on the laser output or possibly the source type wherein the modulation is developed within the laser material. At the receiver end of the system, output data which comprises the received information is supplied to terminal equipment to provide a recorded output of this received information. The terminal equipment at both the transmitter and receiver ends comprises conventional message encoders, preferably of the high speed type. These message encoders have a data handling rate much slower than the rate at which the input data is transmitted in accordance with our invention. For this reason, intermediate data storages 7 and 7′ and data converters 8 and 8′ may be utilized at the transmitter and receiver ends, respectively. For maximum utilization of data storage capacity, especially at the transmitter end, the storage is emptied in the duration of the laser pulse.

Transmitter noise, especially in a system employing a ruby laser and inherent receiver noise provide a serious degrading effect in the performance of conventional analog modulation techniques. However, digital modulation tolerates a considerable amount of receiver and transmitter noise and is preferably employed in our invention. This noise level is decreased by maintaining the laser in a cooled atmosphere.

As one example of digital modulation, eight digits are used for each element of information or character. The digitized information is in the form of six digits per character, a seventh digit is employed as an error detection bit known as a parity check bit, and an eighth digit for character synchronizing purposes. A minimum transmission rate of 400 words per one 0.001 second duration light pulse per second is achieved in accordance with our invention, assuming 40 digits or bits constitute the average length word. For this particular minimum rate of transmission, the intermediate data storage 7, 7′ capacity is $16 \times 10^3$ bits per pulse and the data rate converter 8, 8′ has a data handling rate of $16 \times 10^6$ bits per second. Data rate converter 8 may be a parallel-to-serial converter at the transmitter end and converter 8′ a serial-to-parallel converter at the receiver end. These types of converters are employed since digital information is most conveniently stored in parallel form but is transmitted in serial form. It should be understood, however, that these converters and data storage devices are unnecessary in the event a message encoder is operable at a data handling rate of $16 \times 10^6$ bits per second. In like manner, the converters are unnecessary when employing a data storage device which stores digital information in serial rather than parallel form. A light demodulator 9 is employed in the receiver end for detecting the transmitted light pulses and converting the digital information contained therein into electrical signals.

The detailed block diagram illustrated in FIGURE 3 indicates a preferred embodiment of our invention. Laser 5 is 2 x 0.25 inch ruby rod contained within an inner housing which comprises liquid-nitrogen cooled double-walled Pyrex tube, it being understood that other laser materials and suitable containers may also be employed. An outer housing having an ellipsoidal reflecting surface is employed to support the ruby rod and inner housing at one focus of the ellipsoid and a straight xenon flash lamp 10 at the other focus. The flash lamp is disposed parallel to the ruby rod and is employed as the optical pump and is rated at 1000 joules. An electronic pulser 11 of conventional circuitry actuates the flash lamp at the appropriate times; in this particular embodiment the actuation being at the rate of once a second. The operation of electronic pulser 11 may be programmed and each sequence begun by pressing start button 12. Electrical connections are designated by solid lines in FIGURE 3, conventional light outputs by widely spaced-apart dashed lines, and coherent light beam by closely spaced-apart dashed lines.

Terminal equipment 13 and 13' at the transmitter and receiver ends, respectively, includes the message encoders and may, by way of example, comprise a high speed teletypewriter which punches or prints a paper tape at a speed of 60 words per minute. Punched paper tape 7 at the transmitter end is used as a data storage mechanism and printed paper tape 14 at the receiver end is employed as the received information display element. A flying spot scanner circuit 15 reads the punched paper tape 7 at a prescribed bit rate of $16\times10^3$ bits per 0.001 second by passing a sequential binary coded light signal, corresponding to the holes in punched paper tape 7, through a suitable converging lens (not shown) to photodetector 16. The contents of a prescribed length of the paper tape is thus converted to a plurality of serial electrical pulses at the output of photodetector 16. Flying spot scanner circuit 15 comprises an electron gun supplied with a sweep voltage of step wave form applied to one set of deflection plates and a sweep voltage of a sawtooth wave form applied to a second set of deflection plates wherein the two sets of plates are disposed in perpendicular relationship. The two sweep voltages are supplied from sweep generator 17 and they deflect the flying spot scanner beam over the perforated paper tape. A suitable pulse shaping and gating circuit 18 assures the synchronization of the serial binary electrical pulses with the laser pulse. The output of circuit 18 consists of square wave pulses wherein each pulse represents one bit of the input information. The square pulses are amplified to a peak of 5 kilovolts by a conventional wide frequency band power amplifier 19 in order to be of proper magnitude of power and voltage to provide approximately 50 percentage modulation of the light beam passing through light modulator 6.

The pulsed coherent light output from laser 5 may be modulated either within the laser material itself by techniques known as Zeeman or Kerr cell modulation or external to the laser by using a transmission type modulator such as a Pockels, Kerr, or Faraday cell or traveling wave structure. The specific light modulator employed in our optical pulse communication system is a transmission type Model JW–1 electro-optical light modulator. This modulator is a variable phase-retardation device which linearly controls the relative phase difference of orthogonal components of the polarized light passing through it in proportion to the magnitude of an impressed electric field. Since this device requires polarized incident light, an input polarizer 20 is placed between the laser output and the input to the light modulator to reject unpolarized light. Alternatively, ruby rod 5 may be cut such that the crystal axis is at 90° to the rod axis and polarizer 20 is thereby not required. The output of amplifier 19 supplies the electric field to light modulator 6. The characteristics of the Model JW–1 modulator are such that 100 percent modulation (half-wave retardation) of the laser output is obtained with a modulation voltage of 9000 volts at 0.5 micron wavelength. The maximum frequency of operation of this modulator is $1.6\times10^6$ cycles per second at maximum voltage and a continuous duty cycle. The frequency limitation is determined by the power losses in the metallic electrodes required to produce the electric field in the modulator crystal. However, at reduced operating voltage or reduced duty cycle, this maximum modulation bandwidth is increased since the power loss varies directly with these factors. Thus, a modulation bandwidth of 25 megacycles, which represents a bit rate of 50 megabits per second (three times that required to transmit 400 words during the interval of a 0.001 second pulse per second), may be obtained with 100 percent modulation and a 0.001 duty cycle. The power loss within the JW–1 crystal at this modulation bandwidth is approximately 1.25 milliwatts. The average power required to achieve this bandwidth is approximately 3 watts per megacycle bandwidth or 75 watts at a 0.001 duty cycle. Thus, amplifier 19 need have an average power output rating of approximately 25 watts for the required bandwidth representing 16 megabits per second. An output polarizer or analyzer 21 is positioned at the output of light modulator 6 and converts the modulated wave to intensity or amplitude modulation by passing only the properly polarized light.

Sweep generator 17 is operable at a frequency of $16\times10^6$ cycles per second and synchronized to provide the properly timed vertical and horizontal sweeps to flying spot scanner 15 at the beginning of each light pulse generated by laser 5. The signal for the synchronization is attained by means of a beam splitter 22 which is positioned intermediate the laser output and polarizer 20 and a photodetector 23 which detects the beginning of this light pulse and supplies a signal to initiate the operation of sweep generator 17. Sweep generator 17 is further synchronized by the system or transmitter clock 24 to insure that the horizontal and vertical sweeps occur exactly in phase with the information holes punched on paper tape 7 and thereby generate the information bits at a constant rate at the output of amplifier 19. The output of sweep generator 17 provides a second input to the pulse shape and gating circuit 18 to provide a coincidence signal whereby the output of photodetector 16 may be varied to coincide with the transmitter clock synchronizing signals. Nonlinear hole spacings which may occur in the punched tape 7 are compensated for by providing an output from photodetector 16 as a third input to sweep generator 17. As hereinbefore described, the digitized information is in the form of an eight digit binary code wherein six digits or bits form one character. The eighth digit is used for character synchronizing purposes and is supplied by means of a serially connected transmitter clock 24, synchronous pulse generator 25 and amplifier 26. This eighth digit is transmitted on the laser beam in the form of a signal cross-polarized relative to the polarization of the other seven digits on the beam. The fly-back time of the flying spot scanner occurs during the interval of the eighth digit.

The light demodulator portion of the receiver in our laser pulse communiaction system detects the modulation on the light beam by means of an optical system consisting of collecting lens 27, aperture 28 to reduce background light, an optical interference filter 29 which provides an optical bandwidth preferably as narrow as the light modulator 6 output bandwidth to further reduce background light, and polarization-sensitive photodetector 9 which is a photoemitter device such as a photomultiplier appropriate to the $4.3\times10^{14}$ cycles per second radiation being detected. This optical system is conveniently contained within a suitable telescope body. The output signal of photodetector 9 consists of binary pulses or bits occurring at a $16\times10^6$ bits per second rate. This output is amplified by a conventional wide frequency band voltage amplifier 30. The information as described by the binary bits is displayed by means of a relatively slow operating terminal equipment 13', such as a teletypewriter, thus, an intermediate data storage device such as a magnetic core storage unit 31 is required. A serial-to-parallel converter 8' is utilized to convert the serial form of digital information available at the output of amplifier 30 to a parallel form suitable for storage purposes in magnetic core storage unit 31. The data rate of converter 8' is a minimum of $16\times10^6$ bits per second and the storage rate of magnetic core storage unit 31 has a minimum capacity of $16\times10^3$ bits per 0.001 second which is the duration of the light pulse transmitted by the laser. Converter 8' which is a shift register and unit 31 are of the type employed in electronic digital computers. Synchronization of the serial-to-parallel converter 8' and magnetic core storage unit 31 with the transmitted data during the data storage cycle is achieved by means of a logic and synchronization circuit 32 which detects the signal representing each eighth digit, the character synchronizing or cross-polarized bit of information. Alternatively, a seven digit binary code may be employed, the synchronizing being accomplished by means of a receiver clock 33 and a logic and synchronization circuit 32. In this alternative case, instead of an eighth or cross-polarized bit, a series of synchronizing pulses are transmitted by transmitter clock 24 immediately preceding each transmitted message. These synchronizing pulses provide a positive synchronization between transmitter clock 24 and receiver clock 33 by actuating synchronous pulse generator 34 which in turn initiates receiver clock 33. After the received message has been stored in the core storage unit 31, the core storage address register is reset, the core is addressed at a rate determined by the speed of the terminal equipment 13', and the message is read into the terminal equipment upon voltage amplification of the core signals by a conventional electronic amplifier 35 and printed on paper tape 14.

From the foregoing description, it can be appreciated that our invention makes available a new system of pulse or burst communication employing the visible and near-visible range of the electromagnetic radiation spectrum as the carrier for the information to be transmitted. The pulses of high intensity light are modulated by the information to be transmitted. This information is converted to digital form to provide improved performance in the presence of receiver and transmitter noise. As lasers are further developed, information in analog form may be employed to modulate the laser output. Further, the information transmission rate may be increased as improved lasers permit pulse repetition rates greater than one pulse per second and the generation of longer duration laser pulses. The information transmission rate is presently limited by the peak bit rate of present day commercial serial-to-parallel converters. As this converter peak bit rate is increased to the modulation bandwidth limitation of present day light modulators (25 megacycles per second), and assuming a 0.001 pulse duty cycle, an information transmission of 50 megabits per second is provided thereby transmitting approximately 1250 words per 0.001 second burst.

Having described a new laser pulse communication system, is believed obvious that modifications and variations of our invention are possible in the light of the above teachings. Thus, the transmitter end of the system illustrated in FIGURE 3 may be similar to the receiver end, that is, employ a magnetic core storage unit and parallel-to-serial converter in place of the serial-to-serial converter circuit which includes the punched paper tape 7, flying spot scanner, and photodetector 16. Further, thermoplastic tape, a shift register, electronic devices employing flip-flop circuits, electrostatic charge storage tubes and image orthicons may be utilized as data storage means. Also the pulse code modulation employed is not limited to a binary code of a particular number of bits per address and may include other suitable codes. Finally, the modulation at the transmitter end may be developed within the laser rather than externally thereof. It is, therefore, to be understood that changes may be made in the particular embodiment as described which are within the full intended scope of our invention as defined by the following claims.

What we claim as new and desire to secure by Letters Patent of the United States is:

1. A communication system adapted to transmit and receive digital information comprising in combination means for storing digital input information at the transmitter end of the system, means for generating a high intensity beam of light consisting of relatively short duration pulses at the transmitter end, means for modulating the light pulses with a wide information bandwidth comprising the input information, means for receiving and demodulating the transmitted light pulses and thereby providing the information at a receiver end of the system remote from the transmitter end, means for synchronizing the sequence of information contained on the transmitted and received light pulses, a serial-to-parallel converter connected to an output of said demodulating means, and means connected to the output of said serial-to-parallel converter for storing the digital information at the receiver end whereby the received information may be read out at a desired time.

2. A pulsed laser beam communication system adapted to transmit and receive digital information through a plasma of ionizable gas comprising in combination means for generating a highly directional and collimated beam of coherent light at the transmitter end of the system, said light beam consisting of relatively short duration pulses of intense light characterized by a narrow spectral width, means for storing digital input information in parallel form at said transmitter end, a parallel-to-serial converter connected to the output of said input information storage means whereby said digital input information may be read out in serial form, means for pulse modulating the light pulses with a wide frequency bandwidth comprising the digital input information in serial form whereby the pulse modulated light beam is transmitted at a frequency substantially higher than the frequency of the plasma through which said light beam passes and the spectral temperature of the output of the coherent light generating means is substantially higher than the spectral temperature of the plasma at the frequency of the coherent light generating means, means for receiving and demodulating the transmitted light pulses at the receiver end of the system remote from the transmitter end, means for synchronizing the sequence of digital information contained on the transmitted and received light pulses, a serial-to-parallel converter connected to the output of said demodulating means, and means connected to the output of said serial-to-parallel converter for storing the digital information at the receiver end whereby the received information may be read out at a desired time.

3. A pulsed laser beam communication system adapted to transmit and receive digital information through an air-water interface comprising in combination means for generating a highly directional and collimated beam of coherent light at the transmitter end of the system, said light beam consisting of relatively short duration pulses of intense light characterized by a narrow spectral width, means for storing digital input information in parallel form at the transmitter end, means for reading out the digital input information in serial form, means for modulating the light pulses with a wide frequency bandwidth comprising the digital input information in serial form whereby the modulation frequencies are transmitted through an air-water interface in a relatively short time during which the surface of the water has not changed significantly, means for receiving and demodulating the transmitted light pulses at the receiver end of the system remote from the transmitter end whereby the digital information is provided at said receiver end, means for synchronizing the sequence of the digital information contained on the transmitted and received light pulses, means for converting the serial form digital information at the output of said modulating means to parallel form, and means connected to the output of said serial-to-parallel converting means for storing the digital information at said receiver end whereby the received information may be read out at a desired time and at a relatively slow rate.

4. A pulse communication system adapted to transmit and receive digital information comprising in combination means for generating a high intensity beam of light characterized by a narrow spectral width and consisting of relatively short duration pulses at the transmitter end of the system, means for storing digital input information on tape at the transmitter end, means for reading the tape at a selected rate of words per duration of light pulse, means connected to the output of the tape reading means for generating a sequential binary code corresponding to the digital information stored on the tape, means for modulating the light pulses with a wide information bandwidth comprising the sequential binary code, means for receiving and demodulating the transmitted light pulses and thereby providing the information in serial form at the receiver end of the system remote from the transmitter end, means for synchronizing the sequence of the digital information contained on the transmitted and received light pulses, and means for storing the digital information at the receiver end whereby the received information may be read out at a desired time.

5. A laser pulse communication system adapted to transmit and receive digital information during the interval of laser pulses comprising in combination means for generating a high intensity beam of coherent light consisting of relatively short duration laser pulses at the transmitter end of the system, means for storing digital input information on tape at the transmitter end, means for reading the tape at a predetermined time and at a selected rate of words per duration of laser pulse, means for synchronizing the initiation of the tape reading means with the beginning of each laser pulse, means connected to the output of the tape reading means for generating a sequential binary code corresponding to the digital information read from the tape, means for modulating the laser pulses with a wide frequency bandwidth comprising the sequential binary code whereby said binary code is transmitted at said transmitter end, means for receiving and demodulating the transmitted laser pulses whereby said binary code is received at a receiver end of the system remote from the transmitter end, means for synchronizing the received binary code with the transmitted binary code, a serial-to-parallel converter connected to an amplified output of said demodulating means, and means connected to the output of said serial-to-parallel converter for storing the digital information in parallel form at the receiver end whereby the received information may be read out at a desired time.

6. A laser pulse communication system adapted to transmit and receive digital information at a minimum rate of 400 words per laser pulse of approximately 0.001 second duration comprising in combination means for generating a high intensity beam of coherent light consisting of at least one laser pulse of approximately 0.001 second duration per second at the transmitter end of the system, means for storing digital input information at a minimum rate of $2 \times 10^6$ addresses per second having eight bits per address, a parallel-to-serial converter connected to the output of the digital storage means, said converter having a minimum operating rate of $16 \times 10^6$ bits per second, means including a beam splitter disposed in the path of the laser beam for synchronizing the initiation of the parallel-to-serial converter and digital storage means with the beginning of each laser pulse, means for pulse code modulating the laser pulses with a wide frequency bandwidth containing the digital input information whereby the transmission of a laser pulse empties the input information storage means at a minimum rate of 400 words per duration of laser pulse, means including a lens, aperture, optical filter, and a photoelectric device for receiving and demodulating the transmitted laser pulses at a receiver end of the system remote from the transmitter end, a serial-to-parallel converter connected to the output of the demodulating means, said serial-to-parallel converter having a minimum operating rate of $16 \times 10^6$ bits per second, means for storing the received digital information at a minimum rate of $16 \times 10^6$ bits per duration of laser pulse whereby the received information may be read out at a desired time and at a relatively slower rate, and synchronized transmitter and receiver circuits for transmitting and receiving the digital information in correct sequence.

References Cited by the Examiner

UNITED STATES PATENTS 2,706,215 4/1955 Van Duuren ---------- 178—2

OTHER REFERENCES

Dulberger et al.: Electronic, Nov. 3, 1961, pp. 40–44.

DAVID G. REDINBAUGH, *Primary Examiner.*

J. W. CALDWELL, *Assistant Examiner.*